United States Patent

Nestegard et al.

Patent Number: 5,962,108
Date of Patent: Oct. 5, 1999

[54] RETROREFLECTIVE POLYMER COATED FLEXIBLE FABRIC MATERIAL AND METHOD OF MANUFACTURE

[75] Inventors: Susan K. Nestegard; Tzu Li Huang, both of Woodbury; James C. Coderre, Lake Elmo; James E. Lasch, Oakdale, all of Minn.; Jeffrey D. Janovec, River Falls, Wis.; Michael Ruehlemann, Neuss, Germany

[73] Assignee: Minnesota Mining and Manufacturing Company, St. Paul, Minn.

[21] Appl. No.: 08/434,347

[22] Filed: May 2, 1995

Related U.S. Application Data

[63] Continuation-in-part of application No. 08/236,339, May 2, 1994, abandoned.

[51] Int. Cl.$^6$ .................. B32B 3/00; G02B 5/122
[52] U.S. Cl. .................. 428/172; 428/297.4; 359/529; 359/530; 264/241; 264/257; 264/491; 156/290; 156/308.4
[58] Field of Search ................... 428/167, 172, 428/141, 178, 175, 297.4, 913; 264/405, 257, 136, 167, 173.11, 241, 442, 475, 491, 494; 156/272.2, 290, 308.4; 359/529, 530

[56] References Cited

U.S. PATENT DOCUMENTS

| | | | |
|---|---|---|---|
| 3,684,348 | 8/1972 | Rowland | 350/103 |
| 3,924,929 | 12/1975 | Holmen et al. | 350/103 |
| 4,025,159 | 5/1977 | McGrath | 350/105 |
| 4,576,850 | 3/1986 | Martens | 428/156 |
| 4,588,258 | 5/1986 | Hoopman | 350/103 |
| 4,637,950 | 1/1987 | Bergeson | 428/168 |
| 5,117,304 | 5/1992 | Huang et al. | 350/103 |

FOREIGN PATENT DOCUMENTS

| | | |
|---|---|---|
| 0 270 294 | 6/1988 | European Pat. Off. . |
| WO 94/19711 | 9/1994 | European Pat. Off. . |
| WO 93/10985 | 6/1993 | WIPO . |

OTHER PUBLICATIONS

J. Leighton et al., "RF Welding of PVC and Other Thermoplastic Compounds," *Antec*, 1992, pp. 724–728.

ASTM D 1876–93, Standard Test Method for Peel Resistance of Adhesives (T–Peel Test).

ASTM D 952–93, Standard Test Method for Bond or Cohesive Strength of Sheet Plastics and Electrical Insulating Materials.

*Primary Examiner*—Donald Loney
*Attorney, Agent, or Firm*—Robert H. Jordan

[57] ABSTRACT

A process and article for a retroreflective polymeric coated flexible fabric material having a retroreflective layer and a polymeric compatibilizing layer welded to a polymeric coated outer surface of a flexible fabric material. The compatibilizing layer provides an intermediate layer between the retroreflective layer and the flexible fabric material creating suitable bond strength between dissimilar polymers.

22 Claims, 4 Drawing Sheets

RETROREFLECTIVE POLYMER COATED FLEXIBLE FABRIC MATERIAL AND METHOD OF MANUFACTURE

CROSS-REFERENCE TO RELATED APPLICATION

This application is a continuation-in-part of U.S. application Ser. No. 08/236,339, filed May 2, 1994, now abandoned.

FIELD OF THE INVENTION

The invention relates to retroreflective vehicle covers and in particular to radio frequency welding retroreflective devices to the vehicle cover.

BACKGROUND OF THE INVENTION

Retroreflective conspicuity devices have been developed for use to increase safety and visibility especially during periods of reduced visibility. Generally, the problems related to attaching retroreflective conspicuity sheeting to rigid substrates have been solved. However, difficulties are encountered when it is desirable to attach retroreflective markings to a polymeric coated fabric material. Retroreflective conspicuity markings must be attachable to a flexible substrate, such as fabric material, without interfering with the life and function of the substrate.

Articles which use flexible fabric materials, such as a trailer tarpaulin or a roll-up sign, will typically have a life span up to about ten years. Flexible vehicles covers are particularly convenient, permitting the operator of the vehicle to gain access to the trailers quickly and conveniently, and to allow the trailer compartment to maintain reasonable weatherproofing abilities. The vehicle operator may open and close a cover numerous times each day, therefore the cover should be flexible but strong.

The vehicle cover must withstand harsh weather conditions as well as the mechanical demands placed on it by the operator. The covers encounter extremes in temperature, chemical challenges from atmospheric pollution and road salt, and photo-reaction involving infrared, visible and ultraviolet radiation from sunlight. A retroreflective cover must remain flexible and weatherproof throughout the expected life span.

Flexible fabric materials are typically fabrics manufactured from polyester, nylon or cotton. The fabric is usually coated with a suitable polymer, with the most useful being highly plasticized polyvinyl chloride (PVC).

Highly plasticized PVC is durable and convenient to work with. Highly plasticized PVC is normally attachable to itself or some other suitable polymers with the use of heat or radio frequency welding. Large fabric materials coated with PVC are manufactured by welding smaller panels together. Torn or damaged PVC coated fabric materials are often repairable while still on the vehicle. However, problems are encountered when attempting to use adhesives with PVCs due to the plasticizers which migrate from the PVC into the adhesive. This softens the adhesive and causes loss of its cohesive strength. Another problem relates to mechanical attachment, such as sewing, of materials to PVC flexible covers. This form of attachment often interferes with the waterproofing characteristic of a polymeric coated fabric material.

Other means of attaching PVC coated flexible fabrics include use of thermal and radio frequency energy. A thermal fusion technique, using heat for example from a source such as a hot air gun, increases the thermal kinetic motion of all of the atoms in the polymer chains. When the temperature of the polymer is increased to the melt temperature, the polymer is able to flow adequately to form a bond. For thermoplastic polymers, melting occurs at a temperature below the temperature at which degradation occurs. For suitable thermal fusion to occur, the polymers to be fused should have similar melting temperatures. An example of melting temperature compatibility is highly plasticized PVC and polyurethane. An example of incompatibility is highly plasticized PVC and polycarbonate, because of the substantially higher melting temperature for polycarbonate.

Radio frequency (RF) welding is an alternative to thermal fusion. RF welding accomplishes fusion through the presence of polymer polar groups converting the radio frequency energy into kinetic motion which heats the polymer. When a radio frequency field is applied to a thermoplastic polymer with polar groups, the ability of the polar groups to switch orientation in phase with the radio frequency will determine the degree to which RF energy is absorbed and converted to kinetic motion of the polar group. This kinetic energy is conducted as heat to the entire polymer molecule. If enough RF energy is applied, the polymer will heat sufficiently to melt. A useful measure in determining the degree to which a polymer will absorb energy from an alternating field is the relation of the polymer's dielectric constant and the dielectric dissipation factor known as the loss factor and is given by the following relationship:

$$N=5.55\times10^{-13}(f)(\Im^2)(K)(\tan\delta); \qquad \text{eq. 1}$$

where N is the electric loss in watts/cm$^3$-sec, $f$ is frequency in Hertz/sec, $\Im$ is field strength in volts/cm, K is the dielectric constant, and $\delta$ is the loss angle (tan$\delta$ is the dissipation factor).

This dissipation factor is the ratio of the in-phase to out of phase power. If the polar groups in a thermoplastic polymer have a relative inability to switch orientations in the RF field, this results in a phase lag. This phase lag is known as the loss factor. The higher the dissipation factor, the greater the amount of heat a RF field will generate. Studies with thermoplastic polymers and radio frequency welding have demonstrated that thermoplastic polymers with dissipation factors of approximately 0.065 or higher will form useful welds. For example, PVC has a dissipation factor of approximately 0.09 to 0.10 at 1 MHz, nylon caprolactam has a dissipation factor of 0.06 to 0.09 and polycarbonate has a dissipation factor of only 0.01. The respective dielectric constants for these three compounds are 3.5, 6.4, and 2.96 at 1 MHz.

Polyethylene, polystyrene, and polycarbonate have very low dissipation factors and in practical use have poor radio frequency welding capability. The polyvinyl chlorides, polyurethanes, nylon, and polyesters have reasonably high dissipation factors and have been found in practical use to form very functional RF welds. Reference is made to the article "RF Welding of PVC and Other Thermoplastic Compounds" by J. Leighton, T. Brantley, and E. Szabo in ANTEC 1992, pps. 724–728. These authors did not attempt to weld polycarbonate to the other polymers because of the understanding in the art that a useful weld, using RF energy, would always fail to form.

Only those polar groups within the RF field will be put into motion. The convenience of RF welding is realized by this controlled heating of only the molecules within the RF field. The need for thermal insulation is obviated by the use of RF welding.

PCT Application WO 93/10985 published Jun. 10, 1993, discloses attaching PVC retroreflective articles to a tarpaulin cloth coated with PVC using RF welding. This combination was then hot air fused to a tarpaulin vehicle cover also coated with PVC. To thermally weld the PVC coated cloth to the PVC coated tarpaulin cover, the two surfaces are heated to approximately 400 to 600° C. and the surfaces then pressed together to accomplish the hot air fusion. The purpose of the intermediate tarpaulin cloth attachment was to provide thermal insulation between the hot air and the retroreflective article attached to the tarpaulin cloth to prevent thermal melting, loss of retroreflection and destruction of the retroreflective article.

Cube corner retroreflective articles constructed from PVC have relatively low coefficients of retroreflectivity, generally in the region of approximately 250 candelas per lux per square meter or less. A retroreflective flexible fabric material using high brightness flexible polymer prismatic retrororeflective elements that is relatively simple to attach to the flexible fabric would be desirable.

SUMMARY OF THE INVENTION

This invention provides a high brightness, flexible, durable, retroreflective sheeting compatible for attachment to polymer coated flexible fabric material comprising a polymeric prismatic retroreflective layer having a high coefficient of retroreflectivity and a polymeric compatibilizing layerfor attachement to a flexible polymeric coated fabric material. This invention provides a high brightness, flexible, durable, retroreflective sheeting compatible for attachment to polymer coated flexible fabric material comprising a polymeric prismatic retroreflective layer having a high coefficient of retroreflectivity, a polymeric compatibilizing layer, and a flexible polymeric coated fabric material. The polymeric prismatic retroreflective layer will have a coefficient of retroreflectivity greater than about 250 candelas per lux per square meter and preferably greater than 400 candelas per lux per square meter. The flexible fabric material is suitable for use for personal items of fashion, garments, and safety devices, as well as use on vehicles as vehicle covers, tarpaulins, and conspicuity markers. A useful flexible fabric material is durable as well as flexible. The compatibilizing layer is a polymeric material having characteristics suitable for bonding between a retroreflective layer and a flexible fabric material under conditions using radio frequency welding and/or selective or patterned thermal welding.

A compatibilizing layer is critical in that high brightness retroreflective layers use polymeric material that is dissimilar to the polymeric coating commonly used on flexible fabric materials. A useful compatibilizing layer will form an adequate bond to a retroreflective layer that is characterized by a tensile bond greater than 270 Newtons (60 lb$_f$). The compatibilizing layer will adequately bond with the polymeric coated outer surface of a flexible fabric material as characterized by a T-peel force greater than 8.8 N/cm (5 lbs/in). A useful compatibilizing layer overcomes a bonding, or attachment, incompatibility between a high brightness polymeric retroreflective layer and the polymeric coated outer surface of a flexible fabric material.

Mechanical durability, visibility, and attachment can be suitably altered by providing a suitable polymer film overlay to the retroreflective layer. Along with the retroreflective layer the overlay may incorporate ultraviolet stabilizers to increase durability and may also carry colored or pigmented dyes to further enhance daytime visibility.

The polymer compatibilizing layer is characteristically a thermoplastic polymer having generally a lower melting point in relation to the chosen polymer used in the retroreflective layer and will generally have a favorable dielectric loss factor. Where flexible fabric materials have been coated on their outer surface with PVC polymers plasticized with monomeric plasticizers, the compatibilizing layer can be chosen to adequately perform as a barrier to plasticizer migration. A suitable compatibilizing layer is not limited to a single polymer layer, but may also include multiple layers of compatible polymers to accomplish the bonding of a high brightness retroreflective layer to a polymeric coated flexible fabric material.

BRIEF DESCRIPTION OF THE DRAWINGS

This invention will be further explained with reference to the drawing, wherein.

These figures, which are idealized, are not to scale and are intended to be merely illustrative and non-limiting.

DETAILED DESCRIPTION OF TEE INVENTION

The invention provides useful retroreflective flexible fabric material adaptable for use in numerous applications, for example, but not limited to, use by humans in articles of clothing for safety or fashion or accessories such as a personal bag or back pack, use for articles for pets and other animals, as well as articles for use on signs and machinery such as road signs, roll up signs, flexible vehicle covers, tarpaulins, warning tapes, and conspicuity markings. The retroreflective flexible fabric may comprise all or just a portion of any of these articles. These materials may also be useful in decorative and structural webbing for displaying graphic designs and logos as well as providing patches for attachment to such articles.

The most common flexible fabric material having a polymeric coated surface is fabric material using PVC that has been plasticized with monomeric plasticizers. Suitable base fabrics are weaves or scrims from nylon, polyester, and cotton. Generally, the PVC polymer is coated on at least the outer surface of the flexible fabric base and may contain additional chemicals for coloring and stabilization of the PVC for improved durability, weatherability, and wearability. Often, an additional very thin coating of acrylic will be applied over a surface coated with PVC to enhance the hardness of the PVC surface without significantly altering the physical and chemical properties of the PVC coating.

The PVC provides good flexibility, resistance to abrasion, stability to ultraviolet rays, and performance in cold temperatures. But PVC is also highly plasticized with monomeric plasticizers in order to attain good flexibility. Typically the PVC will contain up to 30 to 40% by weight of monomeric plasticizers.

An alternate useful polymeric material for coating at least an outer surface of a fabric base is ethylene acrylic acid copolymer (EAA). Like the PVC polymer, EAA is flexible, durable, and resistant to abrasion but maintains flexibility without the need for plasticizers.

The present invention provides a high brightness retroreflective polymeric flexible fabric material by providing a compatibilizing means for attaching a high brightness polymeric prismatic retroreflective layer to a polymeric coated flexible fabric material. Polymeric prismatic retroreflective layers are well known in the art as well as the actual geometric configuration of the prismatic elements on a surface of the retroreflective layer or sheet. Suitable polymeric materials for use in the retroreflective layer provide a high coefficient of retroreflectivity.

For the purposes of this invention, a high coefficient of retroreflectivity is at least about 250 candelas per lux per square meter at 0.2° observation angle and −4° entrance angle for the average of 0° and 90° orientation angles. In the present invention polymers useful in the retroreflective layer will meet and preferably exceed this level, preferably providing greater than 400 candelas per lux per square meter and even more preferably providing greater than 600 candelas per lux per square meter. This optical performance requirement limits the suitability of PVC prismatic elements due to the unsuitability of PVC to provide a high coefficient of retroreflectivity for any length of time. This is principally due to the use of the monomeric plasticizers within the PVC and land layer of the retroreflective layer. The tradeoff is the need to provide flexibility using the monomeric plasticizers, but at the cost of allowing migration of the monomeric plasticizers causing deterioration of the optics in a retroreflective layer using PVC as the polymer. The invention provides a compatibilizing layer that performs as a barrier to monomeric plasticizer migration form a PVC coated flexible fabric and the polymeric prismatic elements.

The polymeric materials considered useful for the present invention include but are not limited to polymers able to transmit at least 70% of the intensity of the light incident upon the polymer at a given wavelength. More preferably, the polymers that are used in the retroreflective layer of the invention have a light transmissibility of greater than 80%, and more preferably greater than 90%. The polymeric materials that are employed in the prismatic elements may be thermoplastic or cross-linkable resins.

Examples of thermoplastic polymers that may be used in the prismatic elements and the retroreflective layer include acrylic polymers such as poly(methylmethacrylate); polycarbonates; cellulosics; polyesters such as poly (butyleneterephthalate); poly(ethyleneterephthalate); fluoropolymers; polyamides; polyetherketones; poly (etherimide); polyolefins; poly(styrene); poly(styrene) co-polymers; polysulfone; urethanes, including aliphatic and aromatic polyurethanes; and mixtures of the above polymers such as a poly(ester) and poly(carbonate) blend, and a fluoropolymer and acrylic polymer blend. Background reference for some possible aliphatic urethanes is made to U.S. Pat. No. 5,117,304 (Huang et al.).

Additional materials suitable for forming the polymeric prismatic elements and the retroreflective layer include reactive resin systems capable of being cross-linked by a free radical polymerization mechanism by exposure to actinic radiation, for example, electron beam, ultraviolet light, or visible light. Additionally, these materials may be polymerized by thermal means with the addition of a thermal initiator such as benzoyl peroxide. Radiation initiated cationic polymerizable resins also may be used.

Reactive resins suitable for forming the prismatic elements and the retroreflective layer may include blends of photoinitiator and at least one compound bearing an acrylate group. Preferably the resin blend contains a monofunctional, a difunctional, or a polyfunctional compound to ensure formation of a cross-linked polymeric network upon irradiation.

Examples of resins that are capable of being polymerized by a free radical mechanism include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used here to encompass both acrylates and methacrylates. U.S. Pat. No. 4,576,850 (Martens) discloses examples of cross-linked resins that may be used in the prismatic elements and the retroreflective layer of the present invention.

Ethylenically unsaturated resins include both monomeric and polymeric compounds that contain atoms of carbon, hydrogen and oxygen, and optionally nitrogen, sulfur, and the halogens. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, and unsaturated carboxylic acids, such as acrylic acid, methacrylic acid, itaconic acid, crotonic acid, isocrotonic acid, maleic acid, and the like.

Examples of photopolymerization initiators which can be blended with the acrylic compounds include the following illustrative initiators: benzil, methyl o-benzote, benzoin, benzoin ethyl ether, benzoin isopropyl ether, benzoin isobutyl ether, etc., benzylphenone/tertiary amine, acetophenones such as 2, 2-diethoxyacetophenone, benzyl methyl ketal, 1-hydroxycyclohexylphenyl ketone, 2-hydroxy-2-methyl-1-phenylpropin-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4 (methylthio), phenyl-2-morpholino-1-propinone, etc. The compounds may be used individually or in combination.

Cationically polymerizable materials include but are not limited to materials containing epoxy and vinyl ether functional groups. These systems are photoinitiated by onium salt initiators. Salt initiators such as triarylsulfonum, and diaryliodonium salts.

Preferred polymers for the prismatic elements include poly(carbonate), poly(methylmethacrylate), poly (ethyleneterephthalate), aliphatic polyurethanes and cross-linked acrylates such as multifunctional acrylates or epoxies and acrylated urethanes blended with mono-and multifunctional monomers. These polymers are preferred for one or more of the following reasons: thermal stability, environmental stability, clarity, excellent release from the tooling or mold, and capability of receiving a reflective coating.

Many of the above-mentioned polymers for use in the prismatic elements on one surface of the retroreflective layer will not form adequate bonds directly to highly plasticized PVC or EAA. Furthermore, these prismatic elements may experience interference due to the migration and deposition of monomeric plasticizers from the plasticized PVC material either from direct contact or as a vapor.

The present invention provides an article and method of manufacture for attaching a high brightness retroreflective layer to a flexible fabric material overcoming the incompatibility between high brightness retroreflective layers and polymeric coatings on flexible fabric materials. The present invention provides for suitable polymeric compatibilizing layers that provide for adequate bonding to a retroreflective layer having polymer prismatic elements on a surface as measured by a tensile bond test described below and also characterized by an adequate bonding to a polymeric coating of a flexible fabric material as characterized by an adequate T-peel force as measured by a T-peel test described below. An additional quality in a suitable polymeric compatibilizing layer is to act as a barrier to the migration of monomeric plasticizers migrating from a PVC coated flexible fabric material.

Polymers suitable for use in a compatibilizing layer include the following but are not limited to polyurethane, ethylene methyl acrylate copolymer, ethylene N-butyl acrylate copolymer, ethylene ethyl acrylate copolymer, ethylene vinyl acetate copolymer, polymerically plasticized PVC, and polyurethane primed ethylene acrylic acid copolymer. Polymerically plasticized PVC is considered a distinctly different polymer from monomerically plasticized PVC because the polymeric plasticizers will not migrate from this type of PVC. Polymerically plasticized PVC will remain flexible and will not cause a deterioration in the optical performance of the retroreflective layer.

The present invention comprises construction of a retroreflective flexible fabric material either from the simultaneous application of a retroreflective layer, compatibilizing layer and polymeric coated flexible fabric or a preconstruction of a retroreflective sheeting comprising a retroreflective layer attached to a compatibilizing layer with subsequent attachment of the retroreflective sheeting to a polymeric coated flexible fabric material. The retroreflective sheeting is constructed so as to maintain an excellent degree of flexibility without any cracking or mechanical failure. For example, the sheeting may be wrapped around curved or otherwise non-planar surfaces without damage. In one test, this flexibility was measured by wrapping the retroreflective sheeting around a cylindrical mandrel having a 3.2 mm (0.125 inch) diameter. The test was performed at 0° C. with good results, i.e. no visible cracking. The polymers used for the retroreflective layer, compatibilizing layer and and coated flexible fabric may be dissimilar and the polymers used in the retroreflective layer and the coated flexible fabric may also be incompatible for direct attachment.

In a first embodiment of construction, a suitable retroreflective layer, compatibilizing layer and a polymeric coated flexible fabric material are simultaneously attached using radio frequency energy. The frequency of the radio frequency energy and the field strength are variable by an operator and chosen for suitability dependent upon the polymeric components within the retroreflective layer, compatibilizing layer, and polymeric coated flexible fabric. The choice depends on such factors as the individual polymeric dielectric loss factors, dielectric constants, melting temperatures, and layer thickness. The radio frequency energy is delivered through antennas mounted within appropriate platens that are pressed onto the appropriate surfaces of the retroreflective flexible fabric material applying an appropriate amount of pressure and an appropriate duration of radio frequency energy.

An alternate embodiment of the present invention provides for a selected or patterned thermal welding of a retroreflective layer, compatiblizing layer, and polymeric coated flexible fabric material. In one illustrative embodiment the components are passed between a nip roller and an embossing thermal roller applying a suitable pressure to the components over a raised ridge embossing pattern carried on the surface of the embossing roller. The counter-force nip roller is preferably a sufficiently hard rubber smooth surfaced roller, for example an 85 durometer roller. The embossing roller is patterned to exert pressure into the material being welded only at the point of the raised ridges. Both the embossing roller and the hard durometer roller are heated to suitable temperatures depending upon the composition of polymers used in the retroreflective layer, compatibilizing layer, and polymeric coating on the flexible fabric material. The embossing pattern may be of several suitable patterns such a chain linked pattern as described below.

In another embodiment, heat for achieving the bond between the compatibilizing layer and the substrate is applied from a heating element. In an illustrative embodiment of this approach, a heating element is positioned between the retroreflective sheeting with compatibilizing layer and the substrate, preferably without being in direct contact with either, and then the retroreflective sheeting and substrate are moved by the heating element and pass between pressure rollers after being heated such that a bond between the compatibilizing layer and substrate develops. The heating element, sometimes referred to as a hot wedge, can be configured such that essentially the entire bottom surface of the compatibilizing layer is softened to achieve a universal bond or it may be configured such that longitudinal portions of the compatibilizing layer of the retroreflective sheeting and the substrate are selectively bonded as they pass through, e.g., one or more bands or stripes extending in the direction of movement of the retroreflective sheeting and substrate as it passes the pressure rollers. In an illustrative embodiment of this approach, the hot wedge can be about 10 to 20 millimeters in width, heated to about 460° C., the laminating pressure applied at about 1.6 bar, and the retroreflective sheeting and substrate passed over the heating element and through the roller at about 6 meters/minute. The heating element can be configured to heat only one of the compatibilizing layer and substrate, but it is usually preferred that both components be heated to ensure that a strong attachment is achieved.

In another embodiment, heat for achieving the bond between the compatibilizing layer and the substrate is applied via hot air. A hot air source may be used to warm the compatibilizing layer and/or substrate sufficiently to achieve a bond and then the two webs laminated under pressure. As with the prior embodiment, this technique may be used to achieve a bond across substantially the entirety of the compatibilizing layer or in only selected portions thereof by controlling flow of hot air in such a way that it is directed only to the outer border of the retroreflective sheeting. The latter approach permits obtaining a usefull bond or weld between the compatibilizing layer and substrate in instances where the heat and pressure necessary for a bond are high enough that degradation of the retroreflective prismatic elements occurs. As with the heating element discussed above, the hot air source can be configured to heat only one of the compatibilizing layer and substrate, but it is usually preferred that both components be heated to ensure that a strong attachment is achieved.

As will be understood, the temperature, operating speed, and weld configuration of all of these techniques should be chosen so as to not undesirably degrade the retroreflective sheeting, including its compatibilizing layer, and the substrate.

When a retroreflective sheeting is pre-fabricated prior to its application to a polymeric coated flexible fabric material, the present invention uses radio frequency welding, patterned thermal welding, adhesive attachment, and casting attachment for bonding the compatibilizing layer to the retroreflective prismatic element surface. Radio frequency energy and patterned thermal welding are as described above. These methods of welding attachment may use previously formed compatibilizing layers. These previously formed compatibilizing layers may be either cast or extruded. Adhesive attachment of a previously formed compatibilizing layer uses appropriate adhesives that may be thermal or pressure sensitive and suitable for attaining tensile bond strengths as described below. An alternate attachment method is a casting method whereby an appropriate compatibilizing layer is cast directly onto the prismatic element surface of a retroreflective laye. An additional alternate embodiment provides for an increased barrier characteristic in which the retroreflective layer has a plurality of septa raised on the prismatic surface for attachment of the compatibilizing layer.

Figure 1A:
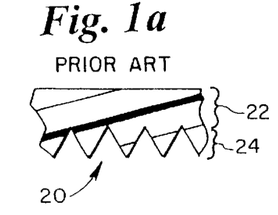
FIGS. 1a–d are sectional diagrammatic views of representative retroreflective layers known in the prior art.
Figure 1B:
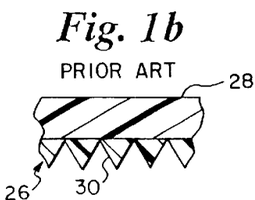

FIGS. 1a–d depict various constructions of retroreflective layers as known in the prior art. In FIG. 1a, retroreflective layer 20 comprises a land portion 22 and a plurality of prismatic elements 24 projecting from a surface of retroreflective layer 20. Retroreflective layer 20 represents a monolithic construction. FIG. 1b depicts a composite construction for a retroreflective layer 26 comprising a body portion 28 and a plurality of prismatic elements on one surface of retroreflective layer 26. The polymeric materials used for body 28 and prismatic elements 30 are different.

Figure 1C:
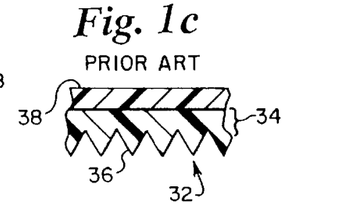

FIG. 1c depicts a construction for a retroreflective layer 32 of monolithic construction having a land 34 and a plurality of prismatic elements 36 on one surface of retroreflective layer 32 and incorporating an overlay layer 38 as an integral portion of retroreflective layer 32.

Figure 1D:
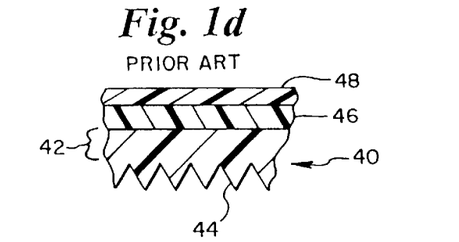

In FIG. 1d, an additional construction is represented in a retroreflective layer 40 comprising a land portion 42, a plurality of prismatic elements 44 on one surface of retroreflective layer 40, a body portion 46, and an overlay 48. The relative percent each portion may represent is variable where, for example, land portion 42 may comprise virtually zero percent of the retroreflective layer 40. Each type of construction as represented in the various FIGS. 1a–d are chosen with considerations for the optical performance that will be required for the application the retroreflective layers will be used in.

Figure 2:
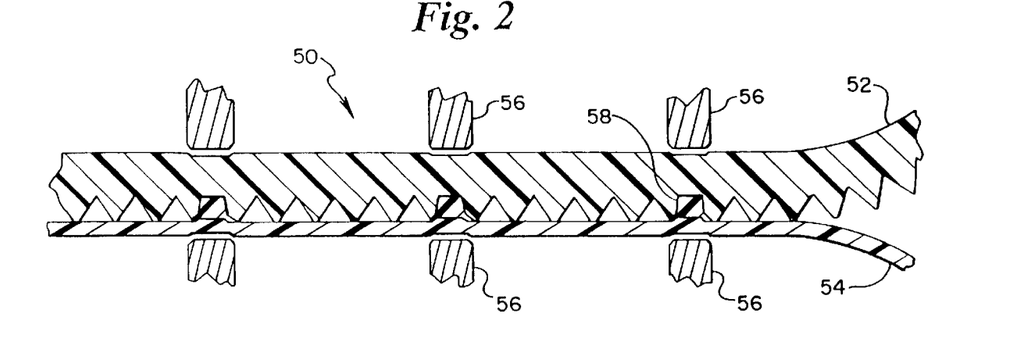
FIG. 2 is a sectional diagrammatic view of an intermediate manufacturing step for a retroreflective sheeting manufactured by the process of the present invention.

FIG. 2 depicts construction of a retroreflective sheeting 50 comprising a retroreflective layer 52 and a compatibilizing layer 54 which have been fused using radio frequency welding energy from platens 56 creating a RF weld 58 between retroreflective layer 52 and compatibilizing layer 54.

Figure 3:
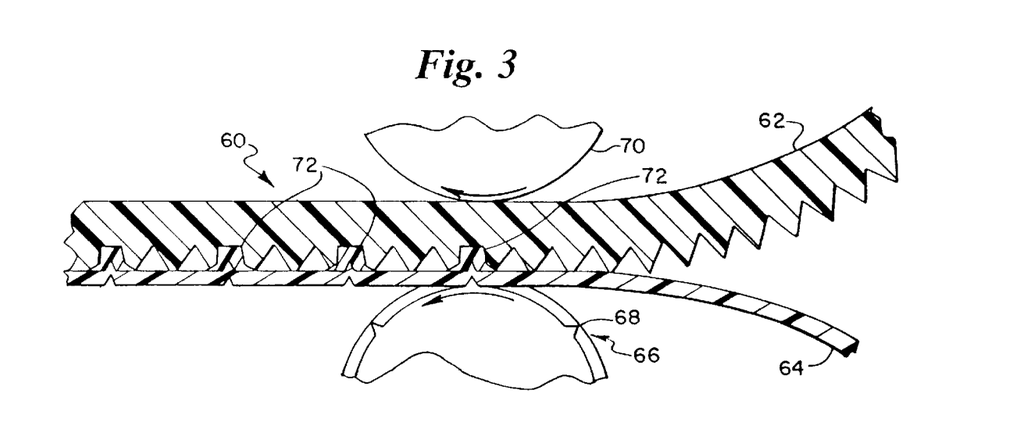
FIG. 3 is a similar view as in FIG. 2 of an alternate embodiment of a retroreflective sheeting manufacturing process.

FIG. 3 depicts an alternate method of constructing a retroreflective sheeting 60 comprising a retroreflective layer 62 and a compatibilizing layer 64 passing between an embossing roller 66 and a durometer roller 70. Embossing roller 66 comprises a patterned raised ridge 68 whereby using heat and pressure between the rollers 66 and 70 a thermal weld 72 is formed between retroreflective layer 62 and compatibilizing layer 64 corresponding to the patterned raised ridge 68.

Figure 4:
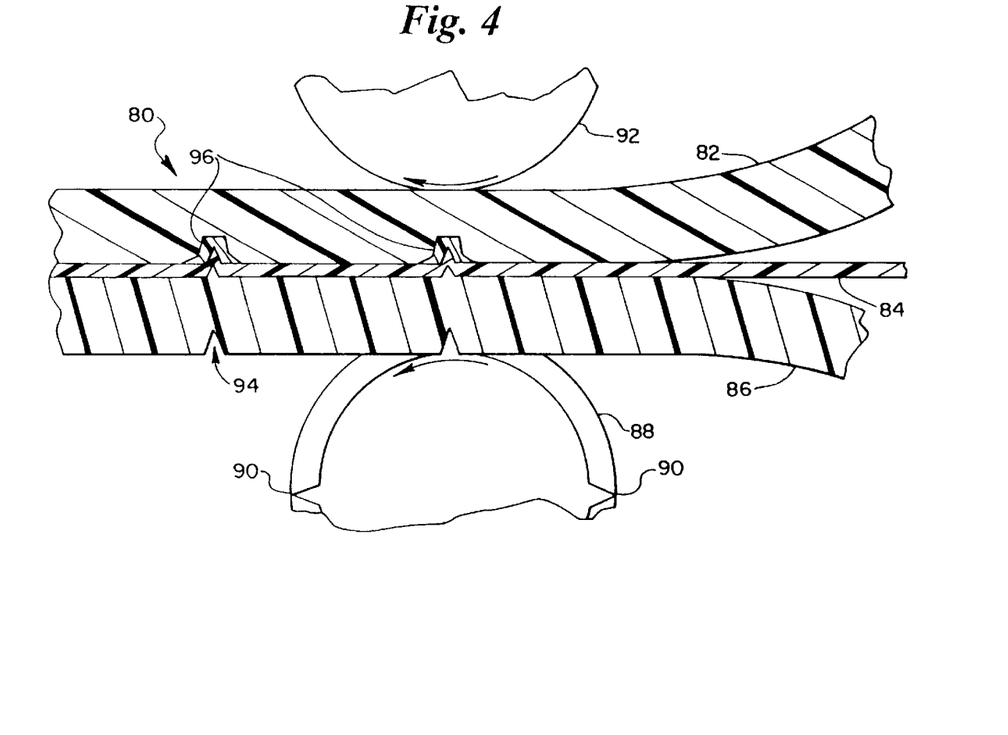
FIG. 4 is a sectional diagrammatic view of a retroreflective flexible fabric material manufactured by the process of the present invention.

In FIG. 4, an embodiment of the present invention is depicted in retroreflective flexible fabric material 80 comprising a retroreflective layer 82, a compatibilizing layer 84, and a flexible fabric material 86. Retroreflective layer 82, compatibilizing layer 84, and flexible fabric material 86 are fed between rollers 88 and 92 creating a patterned thermal weld 96 corresponding to the raised pattern 90 on the surface of embossing roller 88 with a surface defect 94 embossed into flexible fabric 86 corresponding to the embossing pattern 90 on embossing roller 88.

Figure 5:
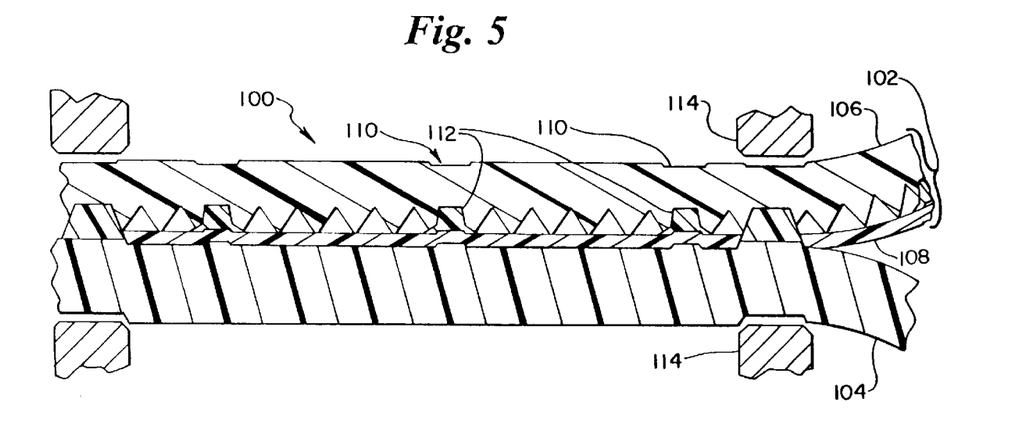
FIG. 5 is a sectional diagrammatic view of a retroreflective flexible fabric material using an alternate embodiment of the present invention.

FIG. 5 depicts an alternate embodiment of the present invention constructing a retroreflective flexible fabric material 100 comprising a retroreflective sheeting 102 and a flexible fabric material 104. Retroreflective sheeting 102 comprises a retroreflective layer 106 and a compatibilizing layer 108 as constructed using radio frequency energy as depicted in FIG. 2. This construction method leads to a depressed portion surface 110 and a RF weld 112 created by the pressure and heat generated by radio frequency welding platens. Retroreflective sheeting 102 and flexible fabric material 104 are fused using radio frequency energy generated from radio frequency antenna/electrode platens 114 creating a radio frequency weld 116.

Figure 6:
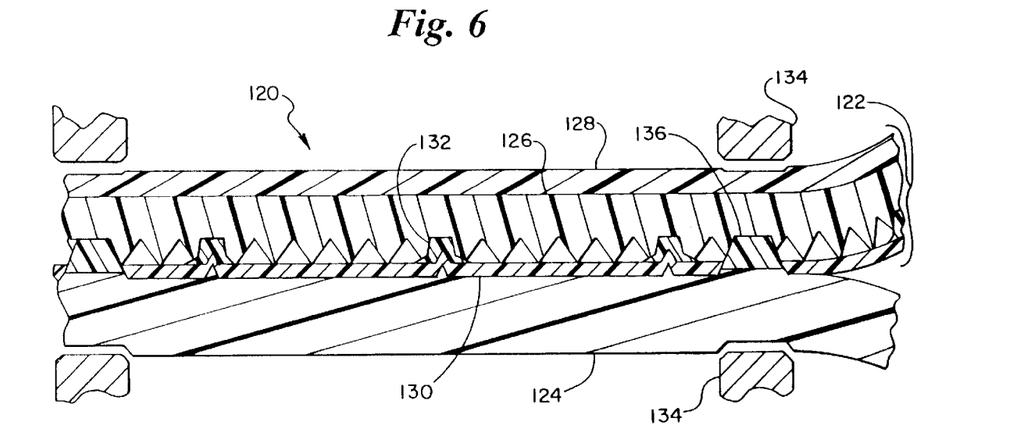
FIG. 6 is a sectional diagrammatic view of an alternate embodiment of the present invention.

An alternate construction for a retroreflective flexible fabric material 120 is depicted in FIG. 6 comprising a retroreflective sheeting 122 and a flexible fabric material 124. Retroreflective sheeting 122 comprises a retroreflective layer 126 having an overlay 128 and a compatibilizing layer 130 which has been previously constructed using the method depicted in FIG. 3 in which retroreflective layer 126 with its overlay 128 was passed between a durometer roller and an embossing roller along with compatibilizing layer 130 facilitating thermal weld sites 132. Retroreflective sheeting 122 and flexible fabric material 124 undergo fusion using radio frequency energy from platens 134 at weld points 136.

Figure 7:
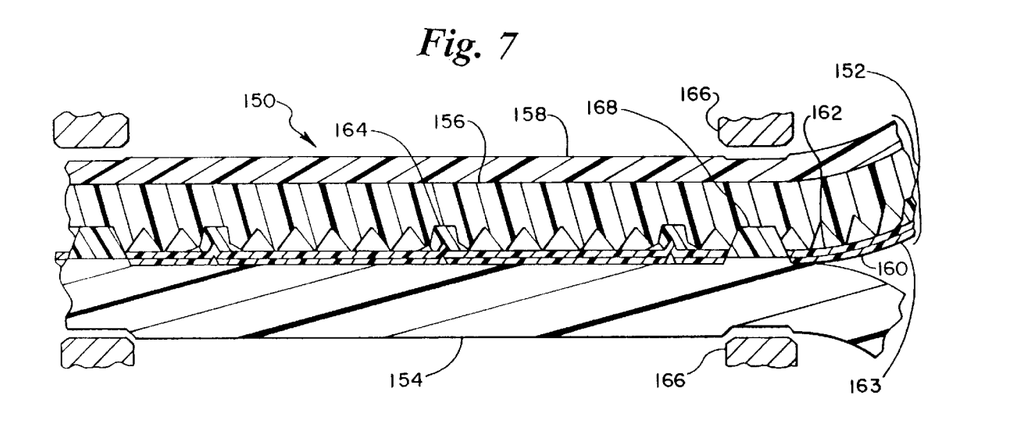
FIG. 7 is a sectional diagrammatic view of an alternate embodiment of the present invention.

FIG. 7 depicts an alternate embodiment of the present invention in a retroreflective flexible fabric material 150 comprising a retroreflective sheeting 152 and a flexible fabric material 154. Retroreflective sheeting 152 comprises a retroreflective layer 156 with an overlay 158 and a compatibilizing layer 160. Compatibilizing layer 160 comprises a primer layer 162 and a carrying layer 163. Retroreflective sheeting 152 is constructed in this embodiment using the method as shown in FIG. 3 where retroreflective layer 156 with overlay 158 is passed between a durometer and an embossing roller along with compatibilizing layer 160 creating a thermal weld 164. Retroreflective sheeting 152 is welded to flexible fabric material 154 using radio frequency energy from radio frequency energy platens 166 creating an RF weld 168.

Figure 8:
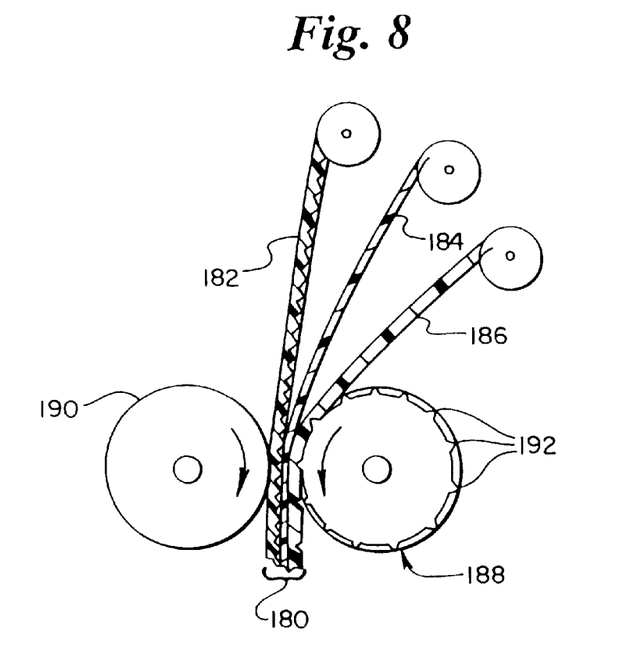
FIG. 8 is a diagrammatic view of an embodiment of the present invention.
Figure 9:
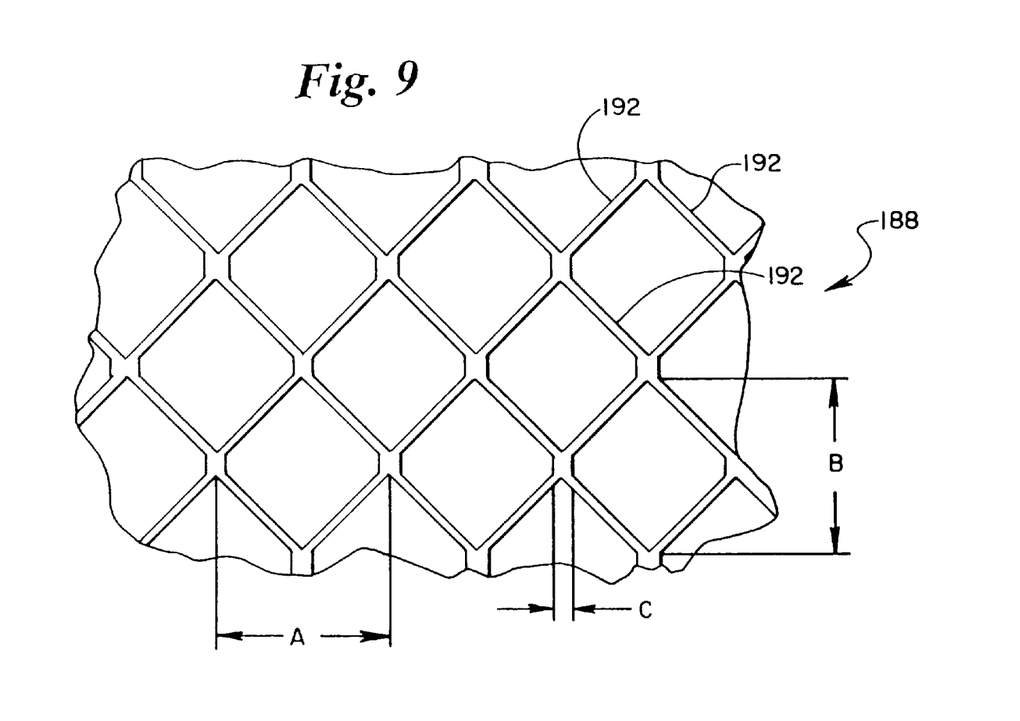
FIG. 9 is a plan view depicting the surface of the embossing wheel shown in FIG. 8.

FIG. 8 discloses a schematic representation of an embodiment of the present invention in which a retroreflective flexible fabric material 180 is manufactured having a retroreflective layer 182, a compatibilizing layer 184, and a flexible fabric material 186. The retroreflective layer 182, compatibilizing layer 184, and flexible fabric material 186 are fed between an embossing roll 188 and a hard rubber roll 190. Embossing roll 188 has raised embossing elements 192 on its surface creating a thermal weld pattern within retroreflective flexible fabric material 180, corresponding to the embossing pattern of raised ridges 192. FIG. 9 depicts a plan view of a raised ridge embossing pattern 192 on the surface of embossing roll 188 showing the pattern dimension measurements A, B, and C which are described below.

The invention also incorporates specularly coated prismatic elements with metal and other suitable reflective coatings as a means for altering the optical performance of the retroreflective layer. The invention anticipates the need to pattern the metallized coatings when using RF welding and to constrain the RF welding to those regions that are void of any metallization. It is recognized that a portion may comprise all of the prismatic element surfaces or less than all of the surfaces.

Colorants, UV absorbers, light stabilizers, free radical scavengers or antioxidants, processing aids such as antiblocking agents, releasing agents, lubricants, and other additives may be added to the retroreflective layer and, body portion or prismatic elements and overlay, if used. The particular colorant selected, of course, depends on the desired color. Colorants typically are added at about 0.01 to 0.5 weight percent. UV absorbers typically are added at about 0.5 to 2.0 weight percent. Examples of UV absorbers include derivatives of benzotriazole such as Tinuvin™ 327, 328, 900, and 1130, Tinuvin-P™, available from Ciba-Geigy Corporation, Ardsley, N.Y.; chemical derivatives of benzophenone such as Uvinul™-M40, 408, and D-50, available from BASF Corporation, Clifton, N.J.; Syntase™ 230, 800, and 1200 available from Neville-Synthese Organics, Inc., Pittsburgh, Pa.; and chemical derivatives of diphenylacrylate such as Uvinul™-N35, and 539, also available from BASF Corporation of Clifton, N.J. Light stabilizers that may be used include hindered amines, which are typically used at about 0.5 to 2.0 weight percent. Examples of hindered amine light stabilizers include Tinuvin™-144, 292, 622, and 770, and Chimassorb™-944 all available from the Ciba-Geigy Corp., Ardsley, N.Y. Free radical scavengers or antioxidants may be used, typically, at about 0.01 to 0.5 weight percent. Suitable antioxidants include hindered phenolic resins such as Irganox™-1010, 1076, 1035, and MD-1024, and Irgafos™-168, available from the Ciba-Geigy Corp., Ardsley, N.Y. Small amounts of other processing aids, typically no more than one percent by weight of the polymer resins, may be added to improve the resin's processibility. Useful processing aids include fatty acid esters, and fatty acid amides available from Glyco Inc., Norwalk Conn., metallic stearates available from Henkel Corp., Hoboken, N.J., and Wax E™ available from Hoechst Celanese Corporation, Somerville, N.J.

Bonding strengths of the retroreflective layers are measured using two types of tests, a tensile bond test and a T-peel test. The tensile bond test is particularly useful in measuring the bonding strength of small sealing patterns, such as disclosed in U.S. Pat. No. 4,025,159 (McGrath); U.S. Pat. No. 3,924,929 (Holmen); or as used in 3M Brand High Intensity Grade reflective sheeting or 3M Brand Diamond Grade reflective sheeting, sold by Minnesota Mining and Manufacturing Company of St. Paul, Minn. The T-peel test is useful in measuring the bond strengths of a retroreflective sheeting attachment to a flexible polymer coated fabric.

The tensile bond test is based on ASTM D 952-93 in that the specimen to be tested is attached between two metal fixtures. For the purposes of the following examples, the test is set up using an upper fixture that is a cubic block of steel 25.4 mm on each edge presenting a one square inch surface. A lower fixture is a 1.6 mm thick plate of aluminum 50 mm wide. For the test, a 30 mm square piece of the retroreflective sheeting of this invention is covered on the top and bottom with a layer of a suitable pressure sensitive tape such as 3M Scotch Brand Adhesive Tape No. 419. The sheeting is placed, compatibilizing layer side down on the center of the aluminum plate and the metal block is placed on the top side of the sheeting. The sheeting is then cut around the edges of the upper block so that a 25.4×25.4 mm square of the sample is tested. The assembled sandwich is then compressed with a force of 1900 Newton (425 lbs.) for 60 seconds. The steel cube is secured in the upper jaw of a standard tensile testing machine and the aluminum plate is secured along 2 sides in a lower gripping fixture of the tester. The jaws are rapidly separated at 500 mm/min (20 in/min) and the force versus displacement curve is recorded and the peak force is reported.

Well bonded compatibilizing layer samples will result in high peak forces, i.e., greater than about 270 N (60 lbs) and preferably greater than about 450 N (100 lbs). The failure mode is typically cohesive (tensile) within the compatibilizing layer or at the prismatic element to compatibilizing layer interface. In some cases, the specimen may fail adhesively at the tape used to secure the compatibilizing layer or the overlay film to the metal fixtures, but if high peak forces are developed, the test results still indicate a good bond was formed between the compatibilizing layer and cube films. Typically a poorly bonded sample will fail adhesively at the cube film to compatibilizing layer interface with low peak force. For some material pairs, bonding will appear excellent but after soaking the sealed sheeting in water for 1 to 10 days the bond strength will decrease significantly indicating a lack of moisture resistance and possible failure under wet conditions outdoors. After a 10 day water soak, the peak force should be greater than about 180 N (40 lbs) and preferably greater than about 360 N (80 lbs).

The T-peel test is based on ASTM D 1876-93 except with the changes noted herein. The samples were cut into strips 25.4 mm (1.0 in) wide perpendicular to the RF or thermal weld. Jaw separation rate was 305 mm/min (12 in/min). Peak peel forces are reported, since the bond line is only about 5 mm long in the peel direction.

Features and advantages of this invention are further illustrated in the following examples. It recognized, however, that while the examples serve this purpose, the particular ingredients and amounts used, as well as other conditions and details, are not to be construed in a manner that would unduly limit the scope of this invention. In general, for the following examples tested according to the T-peel test, the failure mode was cohesive at the polymer coating/fabric interface.

EXAMPLE 1

Molten polycarbonate resin (Makolon™ 2407, supplied by Mobay Corporation, Pittsburgh, Pa.) was cast onto a heated microstructured nickel tooling containing microcube prism recesses having a depth of approximately 89 micrometers (0.0035 inch). The microcube recesses were formed as matched pairs of cube corner elements with the optical axis canted or tilted 8.15 degrees away from the primary groove, as generally described in U.S. Pat. No. 4,588,258 (Hoopman). The nickel tooling thickness was 508 micrometers (0.020 inch) and the tooling was heated to 215.6° C. (420° F.). Molten polycarbonate at a temperature of 288° C. (550° F.) was cast onto the tooling at a pressure of approximately $1.03 \times 10^7$ to $1.38 \times 10^7$ pascals (1500 to 2000 psi) for 0.7 seconds in order to replicate the microcube recesses. Coincident with filling the cube recesses, additional polycarbonate was deposited in a continuous layer above the tooling with a thickness of approximately 104 micrometers (0.004 inch). A previously extruded 50 micrometer (0.002 inch) thick aliphatic polyester urethane body layer (Morthane™ PNO3, supplied by Morton International, Seabrook, N.H.) was then laminated onto the top surface of the continuous polycarbonate land layer when the surface temperature was approximately 191° C. (375° F.). The combined tooling with laminated polycarbonate and polyurethane body layer was then cooled with room temperature air for 18 seconds to a temperature of 71.1 to 87.8° C. (160 to 190° F.), allowing the materials to solidify. The laminate sample was then removed from the microstructured tool.

EXAMPLE 2

The laminate sample from Example 1 was fed into a nip between a steel embossing roll and a 85 durometer rubber roll with a previously extruded polyurethane compatibilizing layer. The compatibilizing layer was protected by a 25 micrometer (0.001 inch) polyester terephthalate film next to the steel embossing roll. The laminate sample from Example 1 was also protected by a 51 micrometer (0.002 inch) polyester terephthalate film next to the rubber roll. The previously extruded compatibilizing layer is 51 micrometer (0.002 inch) thick and is a blend of 60% aliphatic polyester urethane (Morthane™ PNO3, supplied by Morton International, Seabrook, N.H.) with 40% of a pigmented aromatic polyester urethane (the pigmented aromatic polyester urethane is comprised of 50% aromatic polyester urethane, Estane 58810™ from B.F. Goodrich Co., Cleveland, Ohio, and 50% titanium dioxide, previously compounded in a twin screw extruded and pelletized). The embossing pattern is of a chain link configuration as shown in FIG. 9. The embossing roll surface temperature was 210° C. (410° F.) and the rubber roll surface temperature was 63° C. (145° F.). The rolls were turning at a surface speed of 6.09 meters/min. (20 feet/min.) and the force on the nip was held at 114 N/cm (65 lbs/in). The polyester terephthalate protective layers are then removed from the samples. The laminate sample including the compatibilizing layer was then tested for bond strength according to the tensile test previously described. This example yielded a laminate with a tensile bond strength of 400 N (90 $lb_f$).

EXAMPLE 3

A laminate sample from Example 1 was layered together with a polyurethane compatibilizing layer as described in Example 2 on top of a plasticized PVC coated fabric (Duraskin™ B129134, supplied by Verseidag-Indutex GMBH, Krefeld, Germany). The sample was welded using a bar shaped die, 3.2 mm (0.125 inch) in width. Approximately 1.20 kW radio frequency power was used at a frequency of 27.12 MHz for a dwell of 2.8 seconds and a pressure of 346 N/cm$^2$ (502 psi) to achieve a satisfactory weld. The welding equipment was from Thermatron, Electronics Division of Wilcox and Gibbs, New York, N.Y.

The sample was measured for bond strength in the 180° T-peel mode, and the results are shown in Table 1.

EXAMPLE 4

A laminate sample from Example 1 was layered together with a previously extruded ethylene vinyl acetate copolymer (Ultrathane™ UE 646-04 supplied from Quantum, Cincinnati, Ohio) compatibilizing layer of thickness equal to 104 micrometers (0.004 inch) and also placed on top of a plasticized PVC coated fabric (Duraskin™ B129134, supplied by Verseidag-Indutex GMBH, Krefeld, Germany) as shown in Figure. The sample was welded using an aluminum bar shaped die, 3.2 mm (0.125 inch) in width, 7.5 cm (3 inches) in length. Approximately 1.28 kW radio frequency power was used at a frequency of 27.12 MHz for a dwell of 2.8 seconds and a pressure of 346 N/cm$^2$ (502 psi) to achieve a satisfactory weld using the same equipment described in Example 3.

The sample was measured for bond strength in the 180° T-peel mode, and the results are shown in Table 1.

EXAMPLE 5

The laminate sample described in Example 2 was layered directly on top of a plasticized PVC coated fabric as described in Example 3. The sample was welded using an aluminum bar shaped die, 3.2 mm (0.125 inch) in width. Approximately 1.20 kW radio frequency power was used at a frequency of 27.12 MHz for a dwell of 2.8 seconds and a pressure of 346 N/cm$^2$ (502 psi) to achieve a satisfactory weld using the same equipment described in Example 3.

The sample was measured for bond strength in the 180° T-peel mode, and the results are shown in Table 1.

EXAMPLE 6

A laminate sample was layered together with a polyurethane compatibilizing layer on top of a plasticized PVC coated fabric as described in Example 3. The sample was thermally bonded using a heated channel shaped die in a model PW 220H platen press, supplied by Pasadena Hydraulics, Inc., Brea, Calif. The channel shaped die consisted of parallel raised sections with a width of about 6.35 mm (0.25 inch). The width of the channel was about 50.8 mm (2.00 inch). Approximately 690 to 759 N/cm$^2$ (1000 to 1100 psi) was applied for about 3 seconds with the top platen at 132° C. (270° F.) and the bottom platen at 48.9° C. (120° F.) to achieve a satisfactory bond.

The sample was measured for bond strength in the 180° T-peel mode, and the results are shown in Table 1.

EXAMPLE 7

A laminate sample was layered directly on top of a plasticized PVC coated fabric as described in Example 5. The sample was thermally bonded using a heated channel shaped die in a platen press under conditions as described in Example 6.

The sample was measured for bond strength in the 180° T-peel mode, and the results are shown in Table 1.

EXAMPLE 8

A laminate sample was layered together with a polyurethane compatibilizing layer on top of a plasticized PVC coated fabric as described in Example 3. The layered sample was then fed into a nip between a steel embossing roll with a chain link pattern and a rubber backup roll as described in Example 2. The coated fabric side of the layered sample was positioned next to the rubber roll. The steel roll surface temperature was 149° C. (300° F.) and the rubber roll surface temperature was 26.7° C. (80° F.). The rolls were turning at a surface speed of 1.52 meters/min. (5.0 ft/min.), and the force on the nip was held at 2030 N/cm (180 lbs/inch).

The sample was measured for bond strength in the 180° T-peel mode, and the results are shown in Table 1.

EXAMPLE 9

The laminate sample from Example 1 was fed into a nip between a steel embossing roll and a rubber roll with a previously extruded, polyurethane primed, ethylene acrylic acid copolymer compatibilizing layer. The compatibilizing layer was protected by a 26 micrometer (0.001 inch) polyester terephthalate film next to the steel embossing roll. The laminate sample from Example 1 was also protected by a 26 micrometer (0.001 inch) polyester terephthalate film next to the rubber roll. The previously extruded compatibilizing layer was 52 micrometer (0.002 inch) in total thickness and was a dual layer primed film. The first layer utilized 26 micrometer (0.001 inch) thick clear ethylene acrylic acid copolymer (Primacor™ 3440, The Dow Chemical Company, Midland, Mich.). An aliphatic urethane primer was applied to the first layer to promote adhesion of the compatibilizing layer to the polycarbonate of the laminate sample. The primer (Q-thane™ QC-4820, K. J. Quinn and Co., Inc., Seabrook, N.H.) was solvent coated to form a layer having a final dried coating thickness of about 2.5 micrometers (0.0001 inch). The second layer was also 26 micrometer (0.001 inch) thick and utilized a blend of 60% ethylene acrylic acid copolymer (Primacor™ 3440) with 40% of a pigmented ethylene acrylic acid copolymer. The second layer was adjacent to the polyester terephthalate protection film. The pigmented polyethylene-co-acrylic acid was comprised of 50% ethylene acrylic acid copolymer (Primacor™ 3150) and 50% titanium dioxide, previously compounded in a twin screw extruded and pelletized. The embossing pattern was of the chain link configuration as in Example 2. The embossing roll surface temperature was 182° C. (360° F.) and the rubber roll surface temperature was 49° C. (120° F.). The rolls were turning at a surface speed of 6.09 meters/min. (20 feet/min.) and the force on the nip was held at 2030 N/cm (180 lbs/inch).

The laminate sample including the compatibilizing layer was then tested for tensile bond strength according to the tensile test previously described yielding a value 400 Newtons (93 lbf).

EXAMPLE 10

A laminate sample described in Example 9 was layered directly on top of an EAA coated fabric, such as that fabric/backing used in manufacturing 3M Brand Scotchlite Reflective Roll Up Sign Sheeting Series RS84, and as generally described in commonly assigned co-pending application titled High Strength Non-Chlorinated Multi-Layered Polymeric Article Ser. No. 08/082,037, filed Jun. 24, 1993. The sample was thermally bonded using a heated channel shaped die in a platen press as described in Example 6. Approximately 690 to 759 N/cm$^2$ (1000 to 1100 psi) was applied for about 3 seconds with the top platen at 149° C. (300° F.) and the bottom platen at 48.9° C. (120° F.) to achieve a satisfactory bond.

The laminate sample including the compatibilizing layer was then tested for bond strength according to the tensile test previously described and the results are given in Table 1.

TABLE 1

| Example Number | T-Peel Force Newtons/cm |
|---|---|
| 3 | 19.6 |
| 4 | 8.9 |
| 5 | 15.6 |
| 6 | 29.5 |
| 7 | 34.1 |
| 8 | 11.8 |
| 10 | 30.5 |

EXAMPLE 11

To demonstrate the effects of monomeric plasticizer migration, a retroreflective layer produced according to the method of Example 1 was layered next to a duraskin canvas as described in Example 3 oriented with the prismatic element surface next to the gloss side of the polymeric coated fabric. This combination was sealed around the perimeter with adhesive tape completely enclosing the structure. A second sample was prepared similarly but with the inclusion of a 50 micrometer (0.002 inch) thick polyurethane film as described in Example 2 placed between the prismatic element surface of the retroreflective layer and the PVC coated flexible fabric.

Initial coefficients of retroreflectivity were measured at 0.2° observation angle and −4° entrance angle on a retroluminometer, Model MCS-7-7.0, from Todd Products Corporation, Farmington, N.Y., obtaining values of approximately 1,400 candelas per lux per square meter. These samples were then placed in an oven for fourteen days at 70° C. (150° F.) to accelerate the migration of monomeric plasticizer. This test is estimated to predict performance of two years at room temperature. The coefficient of retroreflectivity was measured after this exposure. The retroreflective layer in the sample that did not contain the compatibilizing layer acting as a barrier to monomeric plasticizer migration appeared milky and had a coefficient of retroreflectivity of 4 candelas per lux per square meter equating to a loss of over 99% of the retroreflectivity. In the sample that did include the compatibilizing layer acting as a barrier to the migration of monomeric plasticizer, the retroreflector layer did not have any milky appearance and retained 100% of its original retroreflectivity.

Various modifications and alterations of this invention will become apparent to those skilled in the art without departing from the scope and spirit of this invention.

What is claimed:

1. A flexible laminate retroreflective material suitable for application to a flexible fabric material having a polymer coated outer surface, the retroreflective material comprising:
    a retroreflective layer having a plurality of polymeric prismatic elements on one surface, the retroreflective layer having a high coefficient of retroreflectivity; and
    a compatibilizing layer consisting essentially of a film made from a first polymer, the compatibilizing layer attached to the prismatic element surface of the retroreflective layer and to the polymer coated outer surface of a flexible fabric material, the outer surface of the flexible fabric material comprising a second polymer.

2. The article of claim 1 in which the flexible retroreflective sheeting has flexibility characterized as conforming to a 3.2 mm (0.125" inch) diameter mandrel at 0° C. without visibly cracking.

3. The article of claim 1 in which the article is selected from the list of articles comprising a portion of a road sign, a roll-up sign, article of clothing, an accessory bag, a backpack, a protective cover, a sheet, a tarpaulin, a warning tape, a decorative webbing, a structural webbing, or patches attached to such items.

4. The article of claim 1 in which a portion of the retroreflective layer is specularly coated.

5. The article of claim 1 in which the compatibilizing layer comprises a polymer having a dielectric loss factor greater than about 0.06.

6. The article of claim 1 in which the compatibilizing layer includes polymers selected from a list consisting of polyurethane, ethylene methyl acrylate copolymer, ethylene n-butyl acrylate copolymer, ethylene ethyl acrylate copolymer, ethylene vinyl acetate copolymer, or a polyvinyl chloride containing a polymeric plasticizer.

7. The article of claim 1 in which the compatibilizing layer attaches to the retroreflective layer with a tensile bond force greater than about 270 Newtons (60 $lb_f$).

8. The article of claim 1 in which the compatibilizing layer attaches to the polymeric prismatic elements with a tensile bond force greater than about 270 Newtons (60 $lb_f$).

9. The article of claim 1 in which the welding of the retroreflective sheeting to the flexible polymer coated fabric is accomplished using radio frequency energy.

10. The article of claim 1 in which the welding of the retroreflective sheeting to the flexible polymer coated fabric was accomplished using a patterned thermal welding or selective thermal welding.

11. The article of claim 1 in which the compatibilizing layer comprises a polymer suitable as a barrier to migration of a monomeric plasticizer.

12. The article of claim 1 in which the polymeric prismatic elements include a polymer selected from a list of polymers consisting of acrylic, polycarbonate, polyester, polyurethane, or crosslinked acrylates.

13. The article of claim 1 in which the retroreflective sheeting comprises a sheeting having a coefficient of retroreflectivity of greater than about 250 candellas per lumen.

14. The article of claim 1 in which the welding accomplishes an attachment between the compatibilizing layer and the outer surface of the flexible fabric material characterized by a T-peel force greater than about 8.8 N/cm (5 pounds per inch).

15. The article of claim 1 in which the flexible fabric material outer surface is coated with a first polymer, the prismatic elements comprise a second polymer, and the compatibilizing layer comprises a third polymer, each of said first, second, and third polymers being different.

16. A method for making a retroreflective flexible fabric material, the method comprising the steps of:

providing a flexible fabric material having a polymer coated outer surface;

providing a retroreflective sheeting with a high coefficient of retroreflectivity, the sheeting having:

a retroreflective layer comprising a first polymeric material and having a plurality of polymeric prismatic elements on one surface; and a compatibilizing layer consisting essentially of a film of a second polymer, the compatibilizing layer attached to the prismatic element surface;

positioning the retroreflective sheeting so that the compatibilizing layer is contacting the outer surface of the flexible fabric material; and welding the retroreflective sheeting directly to the outer surface of the flexible fabric material.

17. The method of claim 16 in which the welding accomplishes an attachment between the compatibilizing layer and the outer surface of the flexible fabric material characterized by a T-peel force greater than about 8.8 N/cm (5 pounds per inch).

18. The method of claim 16 in which the flexible fabric material outer surface is coated by a first polymer, the retroreflective layer comprises a second polymer and the polymeric compatibilizing layer comprises a third polymer, each of said first, second, and third polymers being different.

19. The method of claim 16 wherein the retroreflective layer is welded to the flexible fabric material by a method selected from the group consisting of radio frequency welding, a jet of forced hot air fusion, patterned thermal welding, adhesive attachment, casting attachment, and welding by a heating element.

20. A method for making a flexible retroreflective fabric material, the method comprising the steps of:

providing a flexible fabric material having a polymer coated outer surface;

providing a retroreflective layer having a plurality of polymeric prismatic elements on one surface;

providing a compatibilizing layer consisting essentially of a polymeric film;

positioning the compatibilizing layer between the outer surface of the flexible fabric material and the prismatic element side of the retroreflective sheeting; and simultaneously welding the retroreflective layer to the compatibilizing layer and the outer surface of the flexible fabric material.

21. The method of claim 20 in which the retroreflective layer comprises a polymer overlay layer.

22. The method of claim 21 in which the overlay layer comprises a polymer identical to the compatibilizing layer.

* * * * *